United States Patent Office 3,830,903
Patented Aug. 20, 1974

3,830,903
CARBONIZATION OF EXPANDED NATURAL GRAINS
Eli I. Robinsky, 66 Lytton Blvd., and John Timusk, 506 St. Clements Ave., both of Toronto, Ontario, Canada, and Victor R. Riley, 145 The East Mall, Islington, Ontario, Canada
No Drawing. Continuation-in-part of abandoned application Ser. No. 59,326, July 29, 1970. This application Nov. 1, 1971, Ser. No. 194,709
Int. Cl. C01b 31/02; C09c 1/44
U.S. Cl. 423—449
1 Claim

ABSTRACT OF THE DISCLOSURE

A lightweight material in the form of expanded stabilized natural grains or cereals such as puffed wheat or puffed rice which are treated by a stabilizing means and used either alone or combined with other materials. The treatment of the grains, after expansion by stabilizing the same, such as by carbonization, enhances their properties as a building material by improving mechanical properties, by reducing the softening effect of water, by increasing resistance to biological attack, etc. The carbonized expanded natural grains may be used as an insulating material in discrete particles, or bonded together into boards or other bodies or as a lightweight insulating aggregate for use in concrete or in spray-on applications.

This application is a continuation-in-part of copending application Ser. No. 59,326 filed July 29, 1970, now abandoned.

BACKGROUND OF THE INVENTION

1. Field of Invention

This invention relates generally to lightweight construction materials and more particularly to the use of expanded natural grains or cereals which are treated by a stabilizing means and used either alone, for example, as an insulating material in discrete particles, or combined with other materials, for example, as an aggregate in a concrete mixture or as the bonded material in pressed boards and the like.

2. Description of the Prior Art

In the prior art various materials, such as expanded vermiculite, asbestos-cement, fiberglass, foamed concrete, polystyrene, polyurethane and other plastics are widely used as insulating materials or aggregates in building construction.

Further the use of molded blocks, slabs and other structural units in the fabrication of various building structures is well known in the building industry. It is desirable that such blocks as well as exhibiting sufficient strength for their desired utility, be relatively lightweight and inexpensive to manufacture.

One of the deterrent factors limiting the use of concrete in various building construction applications is the weight of the concrete. The conventional approach for reducing the weight has been to use lightweight aggregates or foamed concrete or combinations of these. Thus, in the prior art various materials have been substituted for conventional aggregates to reduce the weight of concrete and these include the substitution of blast furnace slag, vermiculite and expanded polystyrene.

More recently finely particles of thermoplastics, particularly of foam polystyrene and hydraulic binders, such as cement, have been used for the production of even lighter building material.

SUMMARY OF THE INVENTION

Accordingly, it is an object of the present invention to provide a novel construction material in the form of expanded natural grains or cereals which are treated with stabilizing means, as by carbonizing to form carbonized expanded natural grains.

It is a further object of the present invention to provide a low cost insulating material, using carbonized expanded natural grains as the principal ingredient thereof.

It is yet another object of the present invention to provide a novel concrete mix comprising cement, carbonized expanded natural grains with or without one or more of a primary aggregate, filler, and fibre reinforcement.

It is yet another object of the present invention to provide a novel construction material wherein carbonized expanded natural grains, are bonded together to form pressed boards.

It is yet another object of the present invention to provide a process whereby carbonized expanded natural grains are used to produce a novel construction material.

A significant feature of the present invention resides in the utilization of natural grains or cereals which are readily available, relatively inexpensive and, in certain geographical areas, in abundance due to surpluses of agricultural products.

These and other objects of the invention will be apparent from the following detailed description.

DESCRIPTION OF THE PREFERRED EMBODIMENTS

The terms "natural grains" and "cereals" are used herein in accordance with their normal and usual meanings in the agricultural arts and thus are generic expressions which mean and include seeds or kernels of plants, such as wheat, oats, barley, corn, etc. The grains or cereals within the scope of this invention are intended to include those which are capable of being expanded by conventional methods and such expanded grains or cereals include "puffed wheat," "puffed rice," etc. Further it is not intended to restrict the scope of the invention to the use of a whole or entire grain and thus the term "grain," as used herein, is intended to include a whole grain, parts of a whole grain, ground grain and/or reconstituted grain.

The method of producing the expanded grains will now be described. A method of expanding the grains for the purposes of the present invention is well known and is the same as that presently employed to produce breakfast cereals such as is described in U.S. Pat. 3,505,076 dated Apr. 7, 1970 to Maloney et al. Moist grains are placed in a closed vessel in which heat and pressure are applied. The pressure is then suddenly released, and instantaneous formation of steam within the kernel causes expansion. Another known method of expanding the grain is by extrusion.

The expanded grains undergo a treatment procedure in which one or more stabilizing means are applied to the expanded grains. The term "stabilizing" is intended to mean the enhancing and fixing of the physical and/or chemical properties of the expanded natural grains in relation to their use as a building material, such as by making them substantially resistant to biological attack or substantially resistant to water penetration. Various stabilizing means may be employed:

(1) Heat treatment to carbonize the expanded grains;
(2) Treating the expanded grains with inedible materials selected from the group consisting of asphalts, creosotes, resins, wax, latex, rubbers, plastics, cement paste, inorganic polymers, bacteriostats such as mercurial compounds, or a combination thereof to form a substantially permanent coating thereon;
(3) By a combination of the foregoing.

The carbonization of the expanded grain may be done by any of the known processes of carbonization such as by passing them through a carbonizing oven wherein the volume of oxygen is controlled at a temperature which will carbonize the expanded grains into carbon beads.

The treating of the expanded grains with the selected inedible material may be accomplished in various ways dependent of the kind of material selected. Some of these treatments, by way of illustration will be described in the Examples to be set out.

Grains are complex vegetable tissues consisting mainly of starch and also resins, oils, etc. During carbonization, the volatiles and water vapour are driven off leaving essentially carbon. It has been found that, after driving off the volatiles, the final carbonized products have about 50% of their original weight.

The physical properties of one type of carbonized expanded natural grain will now be described. A single grain of carbonized expanded carbonized wheat is in the form of a bead and if the bead is broken in half, it exhibits a cellular structure. This structure accounts for the very excellent insulation properties of the beads. Since the beads are essentially carbon, they are substantially inert to biological attack, most chemicals, and various fluids including water. The beads are fire resistant since the volatiles have been substantially removed during carbonization. When air is excluded from the beads such as when they are embedded in a matrix of gypsum or portland cement, the fire resistant characteristics are good. Since air is excluded, the beads remain stable because they cannot be oxidized.

Immersed in water, the beads will continue to float, even after long periods of boiling but a portion of the volume of each bead may become filled with water. However, many of the applications for the beads such as wall insulation are essentially "dry." For exposed or water submerged applications, the beads may be used in combination with a binder such as asphalt or cement paste which makes them substantially impervious to moisture.

Wheat has a unit weight of approximately 48 lbs. per cu. ft. (60 lbs. per bushel, 1 bushel=1.24 cu. ft.). The wheat kernel may be expanded from 5 to 40 times its original volume, and is thereafter reduced only slightly in size by carbonization. The amount of expansion will depend upon the intended use of the product.

The carbonized expanded natural grains may be used directly as an insulating material in the form of discrete particles, or may be bonded together by conventional methods such as by hot pressing, for example, to form an insulation board. Alternatively, the discrete particles may be used as a lightweight aggregate in concrete as hereinafter described.

The embodiment of the invention wherein the carbonized expanded natural grains are utilized as an aggregate for concrete will now be described. It is to be understood that the proportions and types of the components used in concrete mixtures varies over a wide range and it is intended that the scope of the use of the expanded grains not be restricted to the examples hereinafter described. Accordingly, selectively varying the proportions of the components, including the carbonized expanded natural grains, contributes to the versatility of the structural units so formed. The selection of the cement aggregates, fillers and additives will depend upon the use for which the concrete is intended. Some examples of the properties of the structural units which may be varied in addition to strength and weight are density for allowing drilling or fastening of devices, waterproofing characteristics, resistance to fire, acoustical and insulation qualities, etc.

Concrete made with the expanded carbonized natural grains of the present invention may contain one or more of the following materials which are not intended to be restrictive in scope:

1. Cement of the conventional types such as portland, magnesia, high alumina, expanding and regulated set cement and combinations thereof, as well as other binding materials such as plaster of paris, bitumens, etc.

2. Primary aggregates or fillers of the conventional types normally used in concrete, for example, sand vermiculite, asbestos, slag, etc.

3. Conventional additives may also be used, depending on the properties required. For example, the following additives may be used: wetting agents; rapid set promoting agents, e.g., calcium chloride; set retarding agents, e.g., lignosulphonates or certain organic acids; plastifying agents; water reducing agents; waterproofing agents; and air entraining agents.

The invention is further illustrated by the following example.

EXAMPLE 1

Treatment of Expanded Natural Grains

The expanded grains are stabilized by being heated at a suitable temperature for a sufficient duration of time so that the grains are carbonized. This has the effect of stabilizing the grains as well as increasing their resistance to biological attack.

As an alternative, unexpanded cereal grains may be heated to the same temperature range and this results in both the expansion and carbonization of the grains.

EXAMPLE 2

Stabilization of Natural Grains and Their Use With Urethane Foam

This example demonstrates a method of stabilizing the expanded grains. Before being expanded or puffed, unexpanded grains were soaked in a chemical solution of one ounce of phenol mercuric acetate per gallon of water. The saturated grains were then passed through a dryer to reduce the moisture content to the amount required for expansion and were then expanded by conventional puffing procedures. The residue of phenol mercuric acetate remaining in the expanded grains acts as a bacteriostat to inhibit the growth of living organisms which could cause degradation of the grains. The expanded grains were then mixed in a pan mixer with an equal weight of a liquid chemical which produces an expanded urethane foam. The particular chemical formulation used was 16F-1402 produced by General Latex and Chemicals (Canada) Ltd. The mixture of expanded grains and liquid urethane was then placed in a rectangular mould and covered. Within 10 minutes, the liquid urethane expanded to engulf the beads and fill all interstitial voids between the beads. This created a rectangular insulating board of a density of 1.8 lbs./cu. ft.

EXAMPLE 3

Stabilization of Natural Grains and Their Use With Asphalt

This example demonstrates a method of stabilizing the expanded grains. 0.33 cu. ft. of expanded grains were sprayed with a chemical solution of one ounce of phenol mercuric acetate per gallon of water to inhibit the growth of bacteria. The grains were manually mixed while being sprayed. The expanded grains were then passed through a dryer at 180° F. until all the evaporable moisture had been driven off, and were then mixed with a roofing asphalt heated to 400° F. in the amount of 4.5 pounds of asphalt for each cubic foot of beads. The type of asphalt used was 140/150° F. softening point and was supplied by Imperial Oil Ltd., Canada. The mixing was carried out in a slow speed rotary mixer (30 r.p.m.) The asphalt/expanded grain mixture was then poured into a rectangular mould. After cooling, a rectangular insulating board was produced.

EXAMPLE 4

Insulating Board

This example demonstrates a method of stabilizing the expanded grains. Expanded grains were heated at 600° F.

for fifteen minutes in a closed container. This had the effect of producing expanded carbon beads. The beads were then mixed with a roofing asphalt heated to 400° F. in the amount of four pounds of asphalt for each cubic foot of beads. The type of asphalt used was 140/150° F. softening point and was supplied by Imperial Oil Ltd., Canada. The mixing was carried out in a slow speed rotary mixer (30 r.p.m.). The asphalt/expanded carbon bead mixture was then poured into a rectangular mould. After cooling, a rectangular insulating board was produced. The asphalt coating on the carbon beads strengthens the beads and renders them impervious to moisture.

EXAMPLE 5

Stabilization of Natural Grains

This example demonstrates a method of stabilizing the expanded grains. Expanded grains were heated at 600° F. for fifteen minutes in a closed container. This had the effect of producing expanded carbon beads. These beads were then soaked in a solution of colloidal silica for one hour. The particular solution used was Ludox colloidal silica type HS, supplied by E. I. du Pont de Nemours & Co. (Inc.), U.S.A. The carbon beads were then passed through a dryer to remove all evaporable water. The residual coating of silica remaining on the carbon beads strengthened the beads and increased their resistance to moisture absorption.

EXAMPLE 6

Lightweight Concrete

A lightweight concrete is prepared by mixing the carbonized expanded natural grains which have been stabilized as demonstrated in Example 1 with a portland cement mortar. Preferably proportions are as follows: 65% carbonized expanded natural grains to 35% portland cement mortar by volume. In order to facilitate coating of the carbonized natural expanded grains with cement paste, approximately 1% by weight of a conventional air entraining or plasticizing agent is preferably added to the mixture. Preferable proportions for the mortar are 40% cement paste to 60% sand by weight with a water cement ratio for the cement of about 0.4 by weight. The sand is preferably of high quality such as is used for ordinary concrete. The concrete mixture may be cast or moulded and cured as for ordinary portland cement concrete. It has been found that the resulting composite will have the following approximate properties: density 40 p.c.f. compressive strength 300 p.s.i. This material may serve as an acoustic, vapour, and thermal insulating structural building material, and can be used in various applications such as for panels, building blocks, insulating foundations, etc.

EXAMPLE 7

Building Panel Sandwich Core Material

A building panel sandwich core material is prepared by mixing the carbonized expanded natural grains of Example 1 with a portland cement paste with or without small amounts of fillers such as sand or asbestos fibres. Preferable proportions are as follows: 80% carbonized expanded natural grains to 20% portland cement paste by volume. The portland cement paste preferably includes about 5% by weight of asbestos fibres or about 10% by weight of granular fillers such as sand to reduce shrinkage, and preferably has a water cement ratio of about 0.25 by weight. The mixture of carbonized expanded natural grains and paste may be sprayed or cast and cured by conventional methods as for ordinary concrete. It has been found that the resulting composite has a density of approximately 15 p.c.f. and a compressive strength of approximately 50 p.s.i. This material provides an excellent core material for sandwich building panels because of the following reasons:

1. It has a substantial shear modulus or stiffness, and this allows the efficient transfer of shearing stresses between the sandwich faces.
2. It provides an acoustic and thermal insulation barrier.
3. It will bond directly to the sandwich faces due to the setting of the cement provided that a rough surface or mechanical fasteners are present.

The foregoing examples are considered illustrative of the principles of the invention. It is to be understood that since modifications and substitutions may be made both in the proportions and types of cements and/or aggregates used in the mixtures as well as the stabilizing means, provided that natural grains or cereals as set forth herein are employed, the invention is not limited to the examples illustrated and accordingly various modifications and variations may be resorted to falling within the scope of the invention as claimed.

The carbonized expanded natural grains of the present invention are readily and advantageously adaptable for use as a building material in further embodiments which involve conventional techniques or applications wherein lightweight insulating aggregates as set for herein are required. For example, the carbonized expanded natural grains may be used in spray-on applications.

Inasmuch as a significant feature of the present invention resides in the utilization of carbonized expanded natural grains or cereals, one of the advantages of the present invention arises from the fact that agricultural products of this type are relatively inexpensive. Further, during times in which there are wheat surpluses in certain geographical areas, a new commercial market will be available to utilize the wheat as a building material.

It is not intended that the uses of the natural grains of the present invention as an insulating and structural material be limited to the aforementioned uses. The carbonized expanded natural grains of the present invention are readily adaptable to further applications in which material is required having the properties of the carbonized expanded natural grains.

For example, when the expanded natural grains are carbonized, they are stable to very high temperatures, they may be combined with ceramics and used to produce lightweight insulated chinaware for such items as teapots, teacups, serving bowls, etc. Similarly, the carbonized expanded natural grains may be combined with suitable ceramics for the production of high temperature insulating fire bricks.

Carbonized expanded natural grain when mixed with low penetration (oxidized) asphalt to produce an insulated board may be very economically used for roofing material.

What we claim is:

1. A process for preparing a new composition of matter comprising the steps of expanding natural grain between 5 to 40 times its original volume, and then carbonizing the expanded grain in a carbonizing oven to thereby convert the expanded grain into carbonized expanded natural grain having a cellular structure and consisting essentially of carbon.

References Cited

UNITED STATES PATENTS 3,264,073   8/1966   Schmitt _____ 423—445 UX

FOREIGN PATENTS 418,048   10/1934   Great Britain _____ 201—25

OTHER REFERENCES

Mantell "Industrial Carbon" 2nd Ed., 1946, p. 116.

EDWARD J. MEROS, Primary Examiner

U.S. Cl. X.R.

106—97, 288, 307, 308; 201—25; 252—62; 264—29; 423—445